Nov. 27, 1962     B. W. GUSTAFSON     3,065,591

RAKE TOOTH MOUNTING MEANS

Original Filed July 16, 1959

*INVENTOR.*
B.W. GUSTAFSON

United States Patent Office 3,065,591
Patented Nov. 27, 1962

3,065,591
RAKE TOOTH MOUNTING MEANS
Blaine W. Gustafson, Ottumwa, Iowa, assignor to Deere and Company, Moline, Ill., a corporation of Delaware
Continuation of application Ser. No. 827,543, July 16, 1959. This application Jan. 23, 1961, Ser. No. 84,456
8 Claims. (Cl. 56—400)

This invention relates to a rake tooth means particularly for a side-delivery rake or equivalent implement. This application is a continuation of application Ser. No. 827,543, filed July 16, 1959, now abandoned.

The general object of the invention is to provide an improved rake tooth means and mounting therefor. More particularly, the invention features the utilization of mounting means including a block of rubber or similar elastomer material, with mounting means at one end and a rake tooth projecting from the other end. One advantage of the rubber block is that it will not take a permanent set, because of extreme or abnormal conditions, such as when the tooth is abnormally deflected laterally, as by jumping over an adjacent stripper bar. It is a specific object of the invention to improve the mounting means by providing a relatively rigid apertured mounting member to which the elastomer block is secured by molding or the like, portions of the block thus flowing through the apertures in the mounting member. Another object is to provide a construction of the character noted in which the mounting member has a portion disposed generally in intersecting relation with the elastomer block, so that the mounting member is, in its portion in which it is adhered to the block, insulated, so to speak, from the rake bar to which the assembly is mounted.

The foregoing and other important objects and desirable features inherent in and encompassed by the invention will become apparent as a preferred embodiment is disclosed, by way of example, in the ensuing description and accompanying sheet of drawings, the several figures of which are described below.

Figure 2:
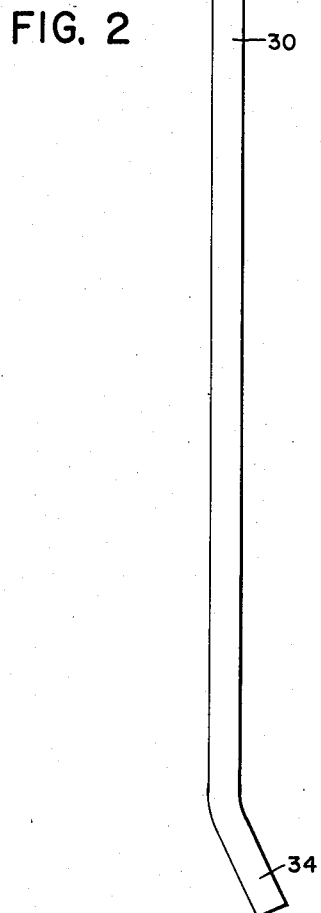
Figure 1:
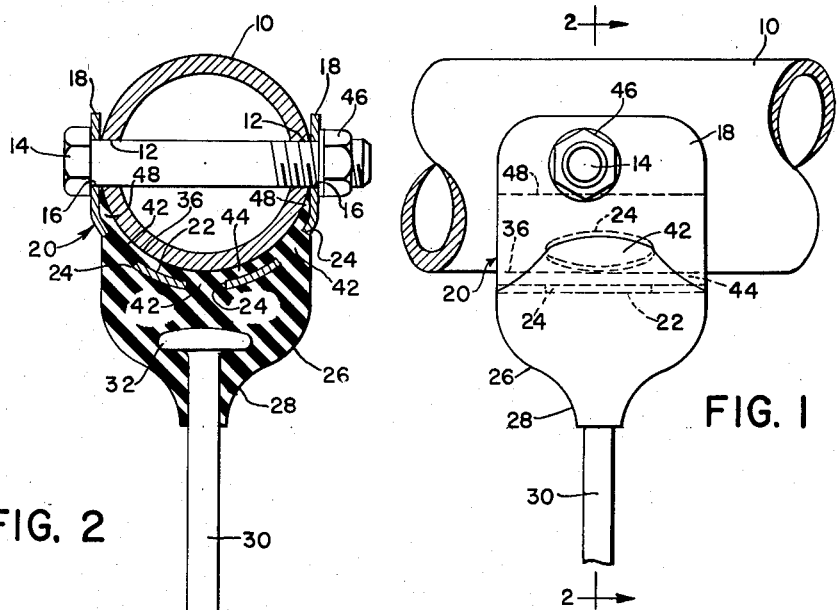
Figure 3:
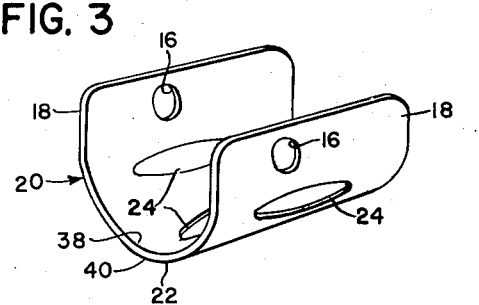

FIG. 1 is a fragmentary elevation of the structure.
FIG. 2 is a section generally on the line 2—2 of FIG. 1 but including the rake tooth in full.
FIG. 3 is a perspective of the apertured mounting member.

The numeral 10 designates a tubular rake bar or pipe which is representative of a reel construction. In the embodiment shown, the pipe or bar is diametrically apertured to provide openings 12 in alinement on a diameter of the pipe. These apertures are adapted to receive securing means, such as a bolt 14 passed through these apertures and through alined apertures 16 in opposite parallel legs 18 of a mounting clip or member 20. This member is of relatively rigid material, preferably metal, and in addition to the legs 18 has a bight 22 which joins the two legs and which itself has a plurality of apertures 24 therein. This specific structure has novelty but in its broader aspects, one leg and the bight can be regarded respectively as first and second portions.

The mounting member or clip 20 carries a mounting block 26 of rubber or equivalent elastomer material. This block has opposite ends, one of which, at 28, is reduced, and a rake tooth or tine 30 has a headed end 32 embedded in the block and projecting therefrom to a free end 34. The opposite end of the block 26 is generally concave to present a surface 36 of similar configuration. The block is joined to the clip 18 by a molding operation in which the bight 22 of the clip intersects the block at a portion thereof intermediate the surface 36 and the opposite end 28, whereby the surface 36 lies toward the bar when the assembly is mounted on the bar. In other words, the surface 36 engages the bar and insulates the clip, as it were, from the bar. Stated otherwise, the bight may be regarded as having inner and outer surfaces 38 and 40, respectively, with the inner surface 38 proximate to the bar and the outer surface 40 remote from the bar and presenting a block-mounting surface of substantial area with which the block 26, because of its cross-section, is substantially coextensive. In the molding operation, integral portions of the block 26, as at 42, flow or are received through the apertures 24, which are located within this area, and these portions spread out laterally beyond the sizes of apertures and flow together to afford an inner arcuate portion 44 between the bar and the bight. Because of the molding operation, the block is adhered to both the inner and outer surfaces of the bight and in addition, the portions 42, flow laterally relative to the apertures so as to complete the adherence of the block to the bar.

The assembly is compelted by the use of a nut 46 on the end of the mounting bolt 14. Portions 48 of the block are carried upwardly at the opposed inner surfaces of the legs 18 and when the nut 46 is tightened on the bolt 14, the assembly is tightly carried by the rake bar so that all flexing is taken by the block 26. As pointed out, the block 26 will not take a permanent set and will adapt itself to extreme operating conditions. The block is subject primarily to stresses in bending; although, it will also accept twisting stresses. The improved rake tooth mounting means may be readily substituted in the field for the conventional coil spring types. It is simply constructed, economical to manufacture and may be readily replaced when worn out or destroyed. Features and advantages other than those enumerated will readily occur to those versed in the art, as will modifications and alterations in the preferred embodiment disclosed, all of which will readily occur without departure from the spirit and scope of the invention.

What is claimed is:

1. Rake tooth means for mounting on a rake bar, comprising: a block of elastomer material having opposite ends, one of which is generally concave to present a bar-proximate surface; a rake tooth secured to the block and projecting from the end opposite to said concave end; and a mounting member having a first portion adapted for connection to the rake bar and a second portion embedded in the concave end of the block and having at least one aperture therein through which an integral portion of the block is received, said second portion being shaped generally in conformance with said concave end and disposed intermediate said bar-proximate surface and said opposite end of the block so that the portion of said block defining said surface lies between said second portion and the bar.

2. Rake tooth means for mounting on a rake bar, comprising: A U-shaped relatively rigid mounting member adapted to embrace the bar and having a pair of legs apertured in alinement and further having a bight joining the legs and presenting an inner surface toward the bar and an outer surface away from the bar, said bight having a substantial area thereof provided with a plurality of apertures therein; a mounting block of elastomer material carried by the bight and projecting from the outer surface of the bight, said block engaging said outer surface substantially coextensively with said area and further having integral portions thereof projecting through the bight apertures and spread out over the inner surface of the bight substantially coextensively with said area; and a rake tooth secured to the block independently of the mounting member and projecting outwardly from said block.

3. Rake tooth means for mounting on a rake bar, comprising: a U-shaped relatively rigid mounting member adapted to embrace the bar and having a pair of legs and a bight joining the legs and presenting an inner surface toward the bar and an outer surface away from the bar, said bight having a substantial area thereof provided with a plurality of apertures therein and said legs having means for affixation thereof to the bar; a mounting block of elastomer material carried by the bight and projecting from the outer surface of the bight, said block engaging said outer surface substantially coextensively with said area and having integral portions thereof projecting through the bight apertures and spread out over the inner surface of the bight substantially coextensively with said area; and a rake tooth secured to the block independently of the mounting member and projecting outwardly from said block.

4. Rake tooth means for mounting on a rake bar, comprising: a relatively rigid mounting member having first and second portions, said first portion having means for connection to the bar and a said second portion being plate-like and having a substantial area thereof provided with a plurality of apertures therethrough and further having opposite surfaces; a mounting block of elastomer material carried by the second portion and projecting from one surface thereof, said block engaging said one surface substantially coextensively with said area and having integral portions thereof projecting through the apertures and spread out over the opposite surface substantially coextensively with said area; and a rake tooth secured to the block independently of the mounting member and projecting outwardly from said block.

5. Rake tooth means for mounting on a rake bar, comprising: a U-shaped relatively rigid mounting member adapted to embrace the bar and having a pair of legs apertured in alinement and further having a bight joining the legs and presenting an inner surface toward the bar and an outer surface away from the bar, said outer surface presenting a substantial mounting area and said bight having at least one aperture therein smaller than and within said area; a mounting block of elastomer material carried by the bight and projecting from the outer surface of the bight, said block engaging said outer surface substantially coextensively with said area and having an integral portion thereof projecting through the bight aperture and enlarged laterally beyond the size of the aperture and engaging the inner surface of the bight; and a rake tooth secured to the block independently of the mounting member and projecting outwardly from said block.

6. Rake tooth means for mounting on a rake bar, comprising: a mounting block of elastomer material having a first end proximate to the bar and a second end spaced from the bar in a direction normal to the length of the bar; a rake tine of relatively rigid material other than that of the block and secured to the block and projecting from the second end of the block substantially as an extension thereof; and U-shaped means at said first end of the block and affording a pocket to receive the proximate portion of the rake bar, said U-shaped means having a pair of legs projecting beyond said first end to straddle the rake bar and a bight member of relatively rigid material embedded in the first end of the block, and said legs respectively including integral extensions of the bight member.

7. The invention defined in claim 6, in which: the bight member has at least one aperture therein through which at least a portion of the block extends so as to achieve an interlock between said bight member and the block.

8. Rake tooth means for mounting on a rake bar, comprising: a relatively rigid mounting member having first and second portions, said first portion having means for connection to the bar and said second portion being plate-like and having a substantial area thereof provided with at least one aperture therethrough and further having opposite surfaces; a mounting block of elastomer material carried by the second portion and projecting from one surface thereof, said block engaging said one surface substantially coextensively with said area and having an integral portion thereof projecting through the aperture and spread out over the opposite surface substantially coextensively with said area; and a rake tooth secured to the block independently of the mounting member and projecting outwardly from said block.

References Cited in the file of this patent

UNITED STATES PATENTS

| | | |
|---|---|---|
| 2,328,121 | Bartek | Aug. 31, 1943 |
| 2,931,161 | Johnston | Apr. 5, 1960 |